United States Patent
Ruiz Orta et al.

(10) Patent No.: US 10,662,287 B2
(45) Date of Patent: *May 26, 2020

(54) FORMULATIONS FOR PRESSURE SENSITIVE ADHESIVES

(71) Applicant: Repsol, S. A., Madrid (ES)

(72) Inventors: Carolina Ruiz Orta, Móstoles (ES); Laura Marín Perales, Móstoles (ES); Sonia Segura Fernández, Móstoles (ES); Rafael Polo Abad, Móstoles (ES); María Dolores Blanco González, Móstoles (ES); Román Galdámez Peña, Móstoles (ES); Mónica García Ruiz, Móstoles (ES); José Miguel Martín Martínez, San Vicente Del Raspeig (ES); Andrés Jesús Yáñez Pacios, San Vicente Del Raspeig (ES)

(73) Assignee: REPSOL, S.A., Madrid (ES)

( * ) Notice: Subject to any disclaimer, the term of this patent is extended or adjusted under 35 U.S.C. 154(b) by 29 days.

This patent is subject to a terminal disclaimer.

(21) Appl. No.: 15/749,435

(22) PCT Filed: Aug. 3, 2016

(86) PCT No.: PCT/EP2016/068544
§ 371 (c)(1),
(2) Date: Jan. 31, 2018

(87) PCT Pub. No.: WO2017/021448
PCT Pub. Date: Feb. 9, 2017

(65) Prior Publication Data
US 2018/0230267 A1 Aug. 16, 2018

(30) Foreign Application Priority Data
Aug. 4, 2015 (EP) .................................... 15382413

(51) Int. Cl.
*C08G 64/34* (2006.01)
*C09J 169/00* (2006.01)
(Continued)

(52) U.S. Cl.
CPC .............. *C08G 64/34* (2013.01); *B01J 27/26* (2013.01); *B65D 33/20* (2013.01); *C08G 18/44* (2013.01);
(Continued)

(58) Field of Classification Search
CPC .... C08G 64/34; C08G 2170/40; C09J 169/00; C09J 7/38; B65D 33/20; B01J 27/26
See application file for complete search history.

(56) References Cited

U.S. PATENT DOCUMENTS 3,330,670 A 7/1967 Grindrod et al.
3,681,277 A 8/1972 Scholz et al.
(Continued)

FOREIGN PATENT DOCUMENTS

EP 0196749 10/1986
EP 1983012 10/2008
(Continued)

OTHER PUBLICATIONS

"International Application No. PCT/EP2016/068544, International Preliminary Report on Patentability dated Jun. 29, 2017", (Jun. 29, 2017), 16 pgs.
(Continued)

*Primary Examiner* — Shane Fang
(74) *Attorney, Agent, or Firm* — Tristan A. Fuierer; Olive Law Group, PLLC

(57) ABSTRACT

The present invention refers to a formulation suitable for the manufacture of a pressure sensitive adhesive, said formulation comprising: a) 40-95 wt % of polyalkylene carbonate having a number average molecular weight higher than
(Continued)

17.000 Da; b) 5-60 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol; and c) optionally, less than 30 wt % of a tackifying resin, provided that said formulation does not contain any reticulating agent.

11 Claims, 4 Drawing Sheets

(51) Int. Cl.
*C09J 7/38* (2018.01)
*C08G 18/44* (2006.01)
*C08L 69/00* (2006.01)
*B01J 27/26* (2006.01)
*B65D 33/20* (2006.01)

(52) U.S. Cl.
CPC ............... *C08L 69/00* (2013.01); *C09J 7/38* (2018.01); *C09J 169/00* (2013.01); *C08G 2170/40* (2013.01); *C09J 2205/114* (2013.01); *C09J 2469/00* (2013.01); *C09J 2471/00* (2013.01)

(56) References Cited

U.S. PATENT DOCUMENTS

| | | | |
|---|---|---|---|
| 4,789,727 A | 12/1988 | Sun | |
| 5,158,922 A | 10/1992 | Hinney et al. | |
| 8,507,708 B2 | 8/2013 | Dehghani et al. | |
| 2002/0081426 A1 | 6/2002 | Inokuchi et al. | |
| 2009/0270540 A1 | 10/2009 | Tonniessen et al. | |
| 2009/0306239 A1* | 12/2009 | Mijolovic | C08G 18/44 521/172 |
| 2013/0059973 A1 | 3/2013 | Wamprecht et al. | |
| 2013/0150526 A1 | 6/2013 | Wamprecht et al. | |
| 2014/0066535 A1 | 3/2014 | Jacobs et al. | |
| 2015/0099829 A1* | 4/2015 | Hong | C08G 64/34 523/400 |

FOREIGN PATENT DOCUMENTS

| | | |
|---|---|---|
| EP | 2845878 | 3/2015 |
| WO | WO-1998038262 | 9/1998 |
| WO | WO-2010022388 | 2/2010 |
| WO | WO-2010028362 | 3/2010 |
| WO | WO-2012071505 | 5/2012 |
| WO | WO-2013158621 | 10/2013 |
| WO | WO-2015022290 | 2/2015 |
| WO | WO-2017021448 | 2/2017 |

OTHER PUBLICATIONS

"International Application No. PCT/EP2016/068544, International Search Report and Written Opinion dated Sep. 1, 2016", (Sep. 1, 2016), 8 pgs.

Coates, Geoffrey W., et al., "Discrete Metal-Based Catalysts for the Copolymerization of CO2 and Epoxides: Discovery, Reactivity, Optimization, and Mechanism", Angewandte Chemie International Edition, 43: 6618-6639, (Nov. 23, 2004), 6618-6639.

Cyriac, Anish, et al., "Immortal CO2/Propylene Oxide Copolymerization: Precise Control of Molecular Weight and Architecture of Various Block Copolymers", Macromolecules, 2010, 43 (18), pp. 7398-7401, (Aug. 27, 2010), 7398-7401.

Luinstra, Gerrit A., et al., "Material Properties of Poly(Propylene Carbonates)", Advances in Polymer Science, vol. 245, Springer, Berlin, Heidelberg, (Jun. 21, 2011), 29-48.

Luinstra, Gerrit A., "Poly(Propylene Carbonate), Old Copolymers of Propylene Oxide and Carbon Dioxide with New Interests: Catalysis and Material Properties", Polymer Reviews, 48(1), 2008, (Feb. 15, 2008), 192-219.

Qin, Zengquan, et al., "Cobalt-Based Complexes for the Copolymerization of Propylene Oxide and CO2: Active and Selective Catalysts for Polycarbonate Synthesis", Angewandte Chemie International Edition, 42: 5484-5487, (Oct. 23, 2003), 5484-5487.

* cited by examiner (b)

(a)

FORMULATIONS FOR PRESSURE SENSITIVE ADHESIVES

PRIORITY CLAIM TO RELATED APPLICATIONS

This application is a U.S. national stage application filed under 35 U.S.C. § 371 from International Application Serial No. PCT/EP2016/068544, which was filed 3 Aug. 2016, and published as WO2017/021448 on 9 Feb. 2017, and which claims priority to European Application No. 15382413.1, filed 4 Aug. 2015, which applications and publication are incorporated by reference as if reproduced herein and made a part hereof in their entirety, and the benefit of priority of each of which is claimed herein.

FIELD OF THE INVENTION

The present invention refers to compositions suitable for the preparation of pressure sensitive adhesives and, in particular, it relates to mixtures of polyalkylene carbonate and polyether carbonate polyol having, optionally, a tackifying resin.

BACKGROUND

Pressure sensitive adhesives, commonly known as PSA, are self-adhesive materials designed to stick on a surface by simple contact under light pressure. The application of pressure is necessary in order to achieve sufficient wet-out onto the substrate surface to provide adequate adhesion. The mode of bonding for a PSA to the substrate is not chemical, in fact this class of adhesives does not undergo any chemical reaction during the bonding process.

Pressure sensitive adhesive compositions are formulated to provide compositions having a certain minimum balance of physical and chemical properties so as to be able to withstand the stress and environment that the product will encounter and be expected to survive in use. The physical or rheological properties of the adhesive, particularly tack, peel adhesion and shear adhesion, must be finely tuned for the application, combining a careful chosen polymer architecture with the proper addition of small molecules such as tackifying resins.

PSAs are particularly easy and safe to use since no chemical reaction takes place and bonding can be done at room temperature.

Pressure sensitive adhesives are based on polymers mainly coming from acrylics, styrenic block copolymers, natural rubber and polyurethanes. There are also niche markets for silicone PSAs, where low temperature use or high-temperature stability is required and cost is not an issue. Rubber-based adhesives are cheap to produce and also the simplest to formulate, since they are typically compounds of natural rubber and low molecular weight tackifying resin miscible with the rubber in similar proportions.

Earlier versions were not cross-linked, but today a cross-linking step is generally performed to avoid flow.

Acrylate copolymer based PSAs are available in a variety of forms (solutions, emulsions, and even hot melts) and have a wide range of properties. However, these adhesives require to be cured after application through the use of curing agents or require the use of energy to dry or cure them after application. Thus, as for natural rubber PSAs, a cross-linking step (electron-beam or UV radiation), once the adhesive has been coated, is generally used to prevent creep.

PSAs based on styrenic block copolymers are generally blends of styrene-isoprene-styrene (SIS) triblocks and styrene-isoprene diblocks compounded with a low molecular weight resin based on $C_5$ rings that is miscible with the isoprene phase but immiscible with the styrene phase. Thus, a tackifying resin is a necessary component for this class of PSA. The styrene domains provide physical cross-links which give rise to superior resistant to creep.

Other formulations of PSA are based on polyurethane pre-polymers having NCO groups available for reaction with water or other chain extenders. Said pre-polymers result from the reaction of polyols, usually obtained by addition polymerization of ethylene oxide or propylene oxide with a polyisocyanate. As an example, EP1983012, EP0196749 and U.S. Pat. No. 3,681,277 describe the preparation of urethane resins or pre-polymers of polyurethane for the manufacture of PSA by reaction of polyisocyanates with polyols derived from polyoxyalkylene compounds.

As an alternative to these materials, polyester or aliphatic polycarbonate polyol compounds have also been used to produce PSA formulations. WO98/38262 describes a pressure sensitive adhesive layer comprising a polyester component and one or more epoxy resins, which is cross-linkable upon exposure to actinic or e-beam irradiation.

US2002/081426 discloses a PSA sheet or layer whose main component is an aliphatic polycarbonate diol of formula $-(O-R-O-C(O))_1-$ wherein R is a linear or branched hydrocarbon group.

Removable adhesives constitute one particular class of PSAs. These adhesives are designed to form a temporary bond, and ideally can be easily removed after long periods of time without leaving any residue on the surface to which they are adhered.

Removable adhesives are used in applications such as surface protection films, masking tapes, bookmark and note papers, price marking labels, promotional graphics materials, and for skin contact. In this sense, Post it® is a particular example of a widely known and used removable adhesive in the prior art.

Some of these removable adhesives are designed to repeatedly stick and unstick, being also used, for example, in resealable packages, such as in food packaging industry, where the user can reseal the package after use, thus preserving freshness and allowing easy access to the product. Some of these formulations include ethylene-vinyl acetate copolymers or mixtures with styrene block copolymers (U.S. 2009/0270540; U.S. Pat. No. 3,330,670).

However, in these applications most of the adhesive formulations require the addition of high amounts of tackifying resin in order to improve the degree of stickiness and, therefore, the adhesion properties of the formulation, components which are in most cases harmful and not environmentally friendly.

Polyalkylene carbonate compounds have been used in the preparation of other formulations in combination with polyols. Particularly, mixtures of polypropylene carbonate and polyols, such as polyether polyols, polyester polyols and polycarbonate polyols have been described in the literature (EP2845878) for the manufacture of resin compositions which are cured in the presence of a curing agent, such as a polyisocyanate, to obtain an interpenetrating polymer network with improved physical properties. Similar mixtures have been described for the manufacture of adhesive formulations (WO2013/158621).

Polyether carbonate polyols have also been combined with polyols in the presence of urethane groups, either in the polyether carbonate polyol structure or in the polyol chain, to produce adhesive formulations and polyurethane foam materials (US2013/150526, US2014/066535 and US2013/059973).

However, mixtures of polyalkylene carbonate with polyether carbonate polyols have not been disclosed in the prior art. In order for these mixtures to be useful as a pressure sensitive adhesive, a suitable miscibility is required between the components constituting the mixture. Furthermore, good adhesion properties, particularly tack, peel adhesion and shear adhesion, are also required.

On the other hand, self-healing polymers (those having the ability to repair themselves autonomously) or healable polymers (those which can be healed upon exposure to an external stimulus, such as heat, light, pressure or mechanical stress) have been developed to make easier the repair of mechanical failures and crack formation in the polymer.

Particularly, a self-healing polymer must possess the ability to form multiple bonding interactions in and around the damaged area, creating connections between the components that make up its structure. This challenge has been treated in the prior art with four different strategies: encapsulation of reactive monomers that are released after a fracture; the formation of new irreversible covalent bonds in the damaged area; supramolecular self-assembly; and the formation of reversible covalent bonds. However, in spite of the various self-healing materials described in the prior art, there is still a need to provide with polymer materials having self-healing properties.

BRIEF DESCRIPTION OF THE INVENTION

The authors of the present invention have found that a mixture of a polyether carbonate polyol with a polyalkylene carbonate has adhesive properties per se and does not require the addition of tackifying resins to impair the required stickiness and adhesive properties to be used as a pressure sensitive adhesive.

As derivable from the experimental part, the polyether carbonate polyol provides the mixture with an adequate tack, peel adhesion and shear adhesion, even in the absence of a tackifying resin or when using very low amounts of this component.

In fact, it has been observed an increase in the miscibility of both components which renders said mixture with improved adhesion properties and an easy removability for resealable applications, when compared to mixtures having also a polyalkylene carbonate but other type of polyol, such as a polyether polyol without any content of $CO_2$, a polyol ester or a polycarbonate polyol in its composition.

Furthermore, the synergy between the increased viscosity and polarity make polyether carbonate polyols more compatible with the polypropylene carbonate than a polyether polyol without any content of $CO_2$ having the same molecular weight and functionality in all composition ranges of the mixture.

Furthermore, the referred mixture neither requires the presence of a reticulating agent to cure the formulation, thus avoiding a cross linking step once the adhesive has been applied to the substrate surface.

The incorporation of the polyether carbonate polyol to polyalkylene carbonate also improves the thermal stability of polyalkylene carbonate which has a degradation temperature relatively low. Surprisingly, as derivable from the TGA results, this improved stability is remarkably higher when compared to the case in which other polyol, such as a polyether polyol without any content of $CO_2$, a polyol ester or a polycarbonate polyol, is incorporated in the polypropylene carbonate.

Additionally, the total content of $CO_2$ in the mixture is increased with the subsequent improvement in its sustainability.

The inventors also have found that the polymer material obtained from the formulation of the invention is able, after being cut, to self-mend by simple contact at room temperature. In fact, the formulation provides a polymer material presenting a quantitative healing efficiency without the addition of a specific catalyst or an external stimulus such as heat or light.

In particular, it has been found that the self-healing process of the polymer material resulting from the formulation of the invention takes place in a reduced period of time and without the need of any external stimulus. So, when the material is cut into two pieces it restores again by just putting the pieces in contact together. Thus, the polymeric material is able to heal damages automatically and autonomously by forming multiple bonding interactions, such as hydrogen bonds and Van der Waals forces, in and around the damaged area.

The experimental data provided and tested by tensile strength measurements have pointed out that a remarkably high self-healing efficiency can be achieved.

Thus, a first aspect of the present invention relates to a formulation suitable for the manufacture of a pressure sensitive adhesive, said formulation comprising:
  a) 40-95 wt % of polyalkylene carbonate having a weight average molecular weight equal to or higher than 17.000 Da;
  b) 5-60 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol; and
  c) optionally, less than 30 wt % of a tackifying resin, wherein the weight percentages of the components a), b) and c) of the formulation are based on the total weight of the formulation, provided that said formulation does not contain any reticulating agent.

In a preferred embodiment, the polyalkylene carbonate is selected from polypropylene carbonate, polyethylene carbonate and mixtures thereof.

In another particular embodiment, the formulation does not include a tackifying resin.

A second aspect of the present invention relates to a process for the preparation of a formulation as defined above, said process comprises mixing:
  (a) 40-95 wt % of polyalkylene carbonate having a weight average molecular weight equal to or higher than 17.000 Da;
  (b) 5-60 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol;
  and,
  (c) optionally, less than 30 wt % of a tackifying resin until a homogeneous mixture is obtained.

Another aspect of the present invention refers to a pressure sensitive adhesive comprising the above referred formulation. In a preferred embodiment, the pressure sensitive adhesive of the invention is a hot melt pressure sensitive adhesive.

Another aspect of the present invention refers to the use of the pressure sensitive adhesive to bond substrates.

A further aspect of the invention refers to a multilayer film comprising the pressure sensitive adhesive as defined above.

A further aspect of the invention relates to a resealable package or parts of a resealable package comprising the pressure sensitive adhesive or the multilayer film according to the invention.

Finally, a further aspect of the invention refers to the use of the formulation as defined above as a self-healing material.

DETAILED DESCRIPTION OF THE INVENTION

Definitions

Figure 1:
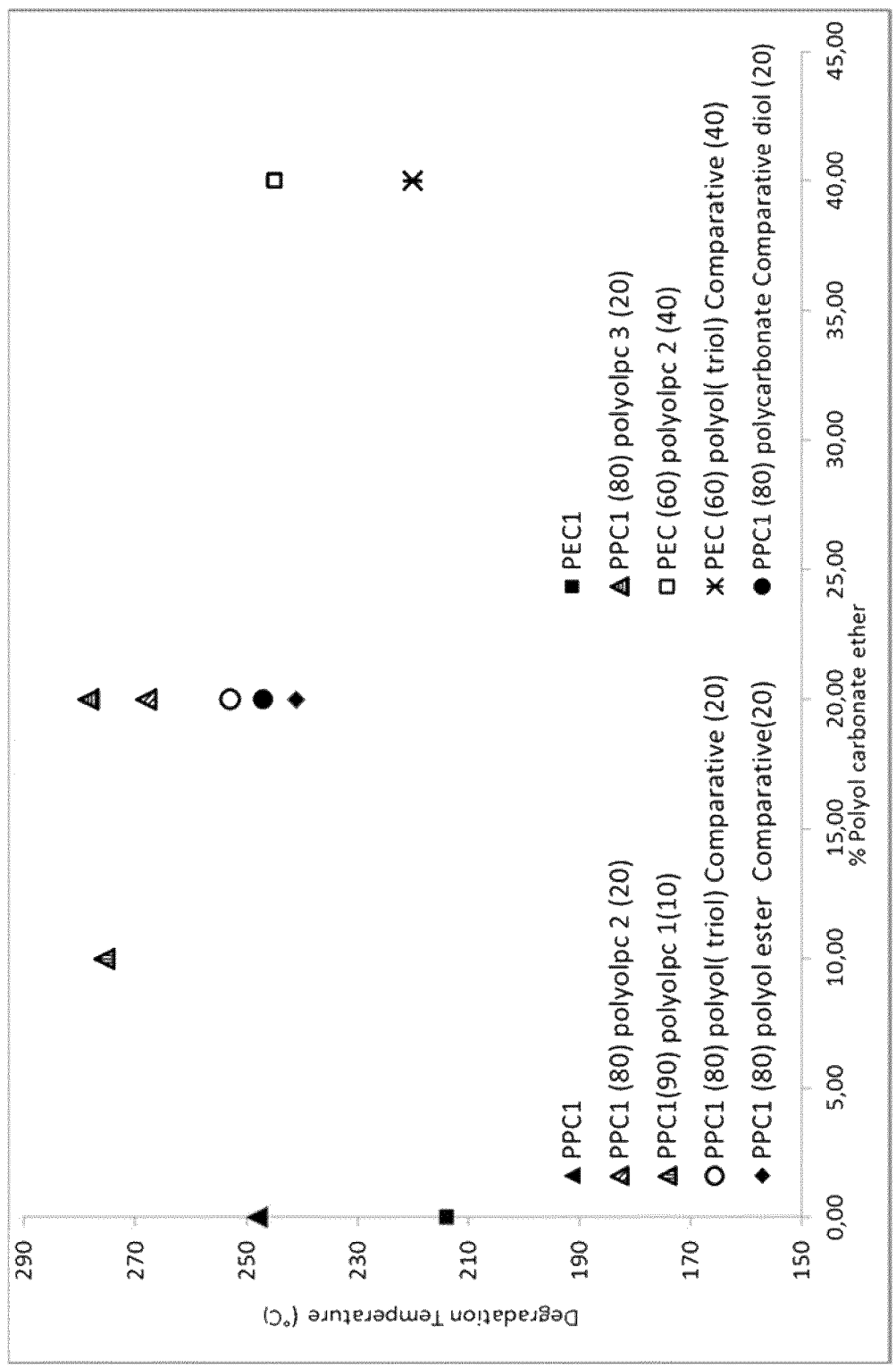
FIG. 1 shows thedegradation temperature of samples having different weight proportions of polyalkylene carbonate and polyether carbonate polyol (polyo1PC), as well as of samples containing polypropylene carbonate and polyether polyol (polyol), polypropylene carbonate and polyol ester and polypropylene carbonate and polycarbonate polyol obtained from TGA (thermogravimetric analysis).

The term "reticulating agent" refers to a chemical compound that allows the curing, toughening or hardening of a polymer material by cross-linking of polymer chains by, for example, ultraviolet radiation, electron beam or heat. The formulation of the present invention is devoid of any reticulating agent as defined herein.

The term "equivalent molecular weight" refers to the ratio of the weight of a polymer to the number of functional/reactive groups in said polymer. In the present case, the polymer is a polyether carbonate polyol whose functional/reactive groups are hydroxyl groups. Thus, the equivalent molecular weight of a polyether carbonate diol is the weight average molecular weight of said polyether carbonate diol divided by two, since said polymer has two functional hydroxyl groups, whereas the equivalent molecular weight of a polyether carbonate triol is the weight average molecular weight of said polyether carbonate triol divided by three, since said polymer has three functional hydroxyl groups.

The values of the weight-average molecular weights (Mw) are determined against polyethylene glycol (PEG) standards by gel-permeation chromatography (GPC) using a Bruker 3800 equipped with a deflection RI detector. Tetrahydrofuran at 1 mL/min flow rate was used as eluent at room temperature.

The term "alkyl" refers to a linear or branched hydrocarbon chain radical, said chain consisting preferably of 1 to 24 carbon atoms, more preferably 1 to 3 carbon atoms, containing no insaturation, and which is attached to the rest of the molecule by a single bond, e.g., methyl, ethyl, n-propyl, i-propyl, n-butyl, t-butyl, n-pentyl, etc.

The term "alkylene" refers to a $C_2$-$C_{24}$ diradical derived from linear or branched saturated hydrocarbon chain by removal of two hydrogen from terminal carbon atoms, and which is attached to the rest of the molecule by single bonds, e.g., ethylene, propylene, butylene, etc.

As mentioned before, the first aspect of the present invention relates to a formulation suitable for the manufacture of a pressure sensitive adhesive, said formulation comprising:

a) 40-95 wt % of polyalkylene carbonate having a weight average molecular weight equal to or higher than 17.000 Da;

b) 5-60 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol; and c) optionally, less than 30 wt % of a tackifying resin, wherein the weight percentages of the components a), b) and c) of the formulation are based on the total weight of the formulation, provided that said formulation does not contain any reticulating agent.

In a particular embodiment, said formulation comprises a mixture comprising components a), b) and optionally c), as defined above. More particularly, said mixture is a physical mixture.

By the term "mixture" or "physical mixture" should be understood a blend or combination of the components of the formulation. Said mixture is obtained following any of the procedures mentioned in the specification below.

Polyalkylene Carbonate

The term poly(alkylene carbonates) (PAC) includes those polymers having ether and carbonate units (Encyclopedia of Polymer Science and Technology, Johnson Wiley and sons, Vol. 3). They are typically prepared by copolymerization of one or more epoxides with $CO_2$, although the present invention is not limited to those prepared by such methods. PACs are known in the art, and the skilled person can select from a wide range attending, for example, to their structure, molecular or physical properties.

According to an embodiment of the invention, the PAC derives (either by being actually used or notionally) from one or more epoxides selected from the group consisting of ($C_2$-$C_{20}$)alkyleneoxide, ($C_1$-$C_{20}$)alkyloxy, ($C_6$-$C_{20}$)aryloxy, ($C_6$-$C_{20}$)arylalkyloxy, ($C_4$-$C_{20}$)cycloalkyloxide, ($C_5$-$C_{20}$) cycloalkyleneoxide and mixtures thereof. Exemplary, non-limitative epoxide compounds may be one or more selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrine, epibromohydrin, glycidyl methyl ether, glycidyl ethyl ether, glycidyl normal propyl ether, glycidyl sec-butyl ether, glycidyl normal or isopentyl ether, glycidyl normal hexyl ether, glycidyl normal heptyl ether, glycidyl normal octyl or 2-ethyl-hexyl ether, glycidyl normal or isononyl ether, glycidyl normal decyl ether, glycidyl normal dodecyl ether, glycidyl normal tetradecyl ether, glycidyl normal hexadecyl ether, glycidyl normal octadecyl ether, glycidyl normal icocyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbonene, limonene oxide, dieldrin, 2,3-epoxide propyl benzene, styrene oxide, phenyl propylene oxide, stilbene oxide, chlorostilbene oxide, dichlorostilbene oxide, 1,2-epoxy-3-phenoxypropane, benzyl oxymethyl oxirane, glycidyl-methylphenyl ether, chlorophenyl-2,3-epoxide propyl ether, epoxypropyl methoxyphenyl ether, biphenyl glycidyl ether, glycidyl naphthyl ether, glycidyl acetic acid ester, glycidyl propionate, glycidyl butanoate, glycidyl normal pentanoate, glycidyl normal hexanoate, glycidyl heptanoate, glycidyl normal octanoate, glycidyl 2-ehtyl hexanoate, glycidyl normal nonanoate, glycidyl normal decanoate, glycidyl normal dodecanoate, glycidyl normal tetradecanoate, glycidyl normal hexadecanoate, glycidyl normal octadecanoate, and glycidyl icosanoate.

According to an embodiment of the invention, the PAC is a compound of chemical formula (I):

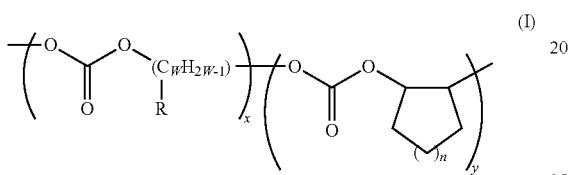

wherein
w is an integer of 2 to 10;
x is an integer equal or greater than 5, preferably of 5 to 100;
y is an integer of 0 to 100;
n is an integer of 1 to 3; and
each R is independently selected from hydrogen, ($C_1$-$C_4$)alkyl, or —$CH_2$—O—R',
wherein R' is ($C_1$-$C_8$)alkyl
and each repeating unit can have the same or a different value for w and/or n.

According to an embodiment of the invention, the PAC can be based on a $C_2$-$C_6$ oxirane, for example a $C_2$, a $C_3$ or a $C_4$, such as poly(ethylene carbonate) (PEC), poly(propylene carbonate) (PPC—see for example, Luinstra G. A.; Borchardt E., Adv. Polym. Sci. (2012) 245: 29-48 and Luinstra, G. A., Polymer Reviews, (2008) 48:192-219), poly(butylene carbonate), or poly(hexylene carbonate). Examples of cyclic aliphatic carbonate may include poly (cyclohexene carbonate), poly(norbornene carbonate) or poly(limonene carbonate). The PAC can be a poly(propylene carbonate), poly(ethylene carbonate), or mixtures thereof. Therefore, the present invention also includes mixtures of different PACs. Such mixtures can be, for example, PAC comprising units of PPC and PEC, or PPC or PEC with other PACs, such as poly(buytylene carbonate), poly(hexylene carbonate), poly(cyclohexene carbonate), poly(norbornene carbonate) or poly(limonene carbonate). In the present invention "alkylene oxide", "epoxide" or "oxirane" are all considered equivalent.

The weight average molecular weight of the PAC is not critical but it should be 17.000 Da or higher, particularly comprised between 20.000 and 1.000.000 Da, preferably between 20.000 and 500.000 Da, even more preferably from 20.000 to 250.000 Da.

In a particular embodiment, the typical glass transition temperature (Tg) of the PAC of the invention is comprised between 5° C. and 40° C.

The glass transition temperature (Tg) is given from the second heating in differential scanning calorimeter (DSC) experiments according to the following procedure. Non-isothermal (10° C./min from −85 to 200° C.) experiments were carried out using a DSC TA Instruments Q2000 under nitrogen flow, operating with an intra-cooler under nitrogen flow. Temperature and heat flow calibrations were performed with indium as standard.

In a preferred embodiment, the polyalkylene carbonate is selected from polypropylene carbonate, polyethylene carbonate and mixtures thereof.

In a particular embodiment, the polyalkylene carbonate is polypropylene carbonate.

The polypropylene carbonate, also referred to as PPC, is the resulting product of copolymerizing $CO_2$ with propylene oxide in the presence of a catalyst. Said reaction provides a compound containing a primary repeating unit having the following structure:

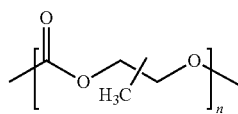

In a particular embodiment, the polypropylene carbonate has a weight average molecular weight equal to or higher than 17.000 Da. In a preferred embodiment, it has a weight average molecular weight ranging from 20.000 to 300.000 Da, more preferably from 20.000 to 250.000 Da, even more preferably from 20.000 to 150.000 Da.

In a particular embodiment, the polypropylene carbonate is obtained by copolymerization of $CO_2$ and propylene oxide in the presence of transition metal catalysts, such as metal salen catalysts, for example cobalt salen catalysts or zinc glutarate catalysts. Suitable catalysts and methods include those mentioned, for example, in WO2010/022388, WO2010/028362, WO2012/071505, U.S. Pat. Nos. 8,507,708, 4,789,727, Angew. Chem. Int., 2003, 42, 5484-5487; Angew. Chem. Int., 2004, 43, 6618-6639; and Macromolecules, 2010, 43, 7398-7401.

In another particular embodiment, the polypropylene carbonate is characterized for having a high percentage of carbonate linkages. Preferably, the polypropylene carbonate has on average more than about 75% of adjacent monomer units connected via carbonate linkages and less than about 25% of ether linkages. More preferably, the polypropylene carbonate has on average more than about 80% of adjacent monomer units connected via carbonate linkages, even more preferably more than 85%, and most preferably from 85 to 90%.

In another particular embodiment, the polypropylene carbonate is comprised in the formulation of the invention in a weight proportion between 55% and 95%, more preferably from 75 to 95 wt % with respect to the total weight of the formulation.

In another particular embodiment, the_polyalkylene carbonate is polyethylene carbonate.

The polyethylene carbonate, also referred to as PEC, is the resulting product of copolymerizing $CO_2$ with ethylene oxide in the presence of a catalyst. Said reaction provides a compound containing a primary repeating unit having the following structure:

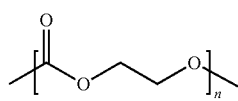

In a particular embodiment, the polyethylene carbonate has a weight average molecular weight equal to or higher than 17.000 Da. In a preferred embodiment, it has a weight average molecular weight ranging from 20.000 to 300.000 Da, more preferably from 100.000 to 250.000 Da, even more preferably from 20.000 to 150.000 Da.

In another particular embodiment, the polyethylene carbonate is characterized for having a high percentage of carbonate linkages. Preferably, the polyethylene carbonate has on average more than about 75% of adjacent monomer units connected via carbonate linkages and less than about 25% of ether linkages. More preferably, the polyethylene carbonate has on average more than about 80% of adjacent monomer units connected via carbonate linkages, even more preferably more than 85%, and most preferably from 85 to 90%.

In another particular embodiment, the polyethylene carbonate is comprised in the formulation of the invention in a weight proportion between 55% and 95%, more preferably from 75 to 95 wt % with respect to the total weight of the formulation.

Polyether Carbonate Polyol

By the term polyether carbonate polyol should be understood a polyether polyol having $CO_2$ groups randomly incorporated in the chemical structure thereof. These $CO_2$ groups are incorporated within the chemical structure of the polyether carbonate polyol by covalent bonds.

Thus, the chemical structure of a polyether carbonate polyol as defined in the present invention consists in repeating units of formula [—O—R—] with hydroxyl end groups, wherein the polymer has randomly incorporated $CO_2$ groups, i.e., some of these repeating groups are —[O—R—O—C(O)—] but others remain as [—O—R—], R being an alkylene group.

Thus, in contrast to a polycarbonate polyol which has essentially 100% carbonate links having the following structure:

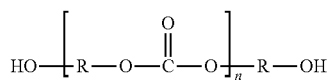

derived from the reaction of a diol with phosgene or a dialkyl or diphenyl carbonate, the polyether carbonate polyol used in the formulation of the present invention does not contain repeating monomer units each having a carbonate group, but repeating polyether polyol units wherein some of them have a $CO_2$ group but others are devoid of said $CO_2$ group. Thus, $CO_2$ groups are not incorporated in all monomer units.

In a particular embodiment of the invention, the polyether carbonate polyol is a polyol comprising terminal hydroxyl groups and comprising fragments of a polymer of chemical formula (II):

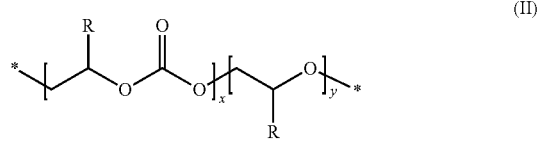

(II)

wherein R is hydrogen or a $C_1$-$C_{22}$ alkyl group, x is an integer between 1 and 500 and y is an integer between 2 and 500, with the proviso that y is greater than x.

In another particular embodiment, each of x and y is greater than 2, preferably greater than 3.

In another particular embodiment, R is hydrogen or a $C_1$-$C_3$ alkyl group.

Particularly, the weight proportion of $CO_2$ in the polyether polyol structure ranges from 0.5 to 40 wt % based on the total weight of the polyether carbonate polyol.

The preparation of polyether carbonate polyols can be made by a process comprising copolymerizing one or more H-functional initiator substances, one or more alkylene oxides and carbon dioxide in the presence of a double metal cyanide (DMC) catalyst.

Typically, alkylene oxides having from 2 to 24 carbon atoms can be used. Examples of said alkylene oxides include, among others, one or more compounds selected from the group consisting of optionally substituted ethylene oxide, propylene oxide, butene oxides, pentene oxides, hexene oxides, heptene oxides, octene oxides, nonene oxides, decene oxide, undecene oxides, dodecene oxides, cyclopentene oxide, cyclohexane oxide, cycloheptene oxide, cyclooctene oxide and styrene oxide. Substituted alkylene oxides preferably refer to alkylene oxides substituted with a $C_1$-$C_6$ alkyl group, preferably methyl or ethyl. Preferred alkylene oxides are ethylene oxide, propylene oxide, butene oxide, styrene oxide and mixtures thereof. In a particular embodiment, the alkylene oxide is propylene oxide.

The term "H-functional initiator substance" refers to a compound having H atoms active for the alkoxylation, such as, for example, alcohols, primary or secondary amines, or carboxylic acids. Suitable H-functional initiator substances include one or more compounds selected from the group consisting of mono- or poly-hydric alcohols, polyvalent amines, polyvalent thiols, aminoalcohols, thioalcohols, hydroxy esters, polyether polyols, polyester polyols, polyester ether polyols, polyether carbonate polyols, polycarbonate polyols, polycarbonates, polyethyleneimines, polyether amines, polytetrahydrofurans, polytetrahydrofuranamines, polyether thiols, polyacrylate polyols, castor oil, the mono- or di-glyceride of ricinoleic acid, monoglycerides of fatty acids, chemically modified mono-, di- and/or tri-glycerides of fatty acids, and $C_1$-$C_{24}$-alkyl fatty acid esters that contain on average at least 2 hydroxyl groups per molecule.

In a particular embodiment, the H-functional initiator substance is a polyhydric alcohol also known as polyol, more particularly is a polyether polyol, preferably having a number molecular weight from 100 to 4.000 Da. More preferably, the polyether polyol has a functionality from 2 to 8, i.e., it has from 2 to 8 hydroxyl groups per molecule, even more preferably is a diol or a triol.

Suitable polyether polyols include poly(oxypropylene) polyols, ethylene oxide-capped poly(oxypropylene) polyols, mixed ethylene oxide-propylene oxide polyols, butylene oxide polymers, butylene oxide copolymers with ethylene oxide and/or propylene oxide, polytetra methylene ether glycols and the like. Most preferred are poly(oxypropylene) polyols, particularly having from two to eight hydroxyl groups, more preferably diols and triols, having number average molecular weights lower than 2.000 Da, more preferably between 200 and 1.000 Da, even more preferably between 300 and 800 Da.

More preferably, the polyether polyol used as the H-functional initiator substance has been synthesized by acidic catalysis, i.e. by polymerizing an epoxide in the presence of active hydrogen-containing initiator and acidic catalysts. Examples of suitable acidic catalysts include Lewis acids such as $BF_3$, $SbF_5$, $Y(CF_3SO_3)_3$, or Brönsted acids such as $CF_3SO_3H$, $HBF_4$, $HPF_6$, $HSbF_6$.

In a particular embodiment, the H-functional initiator substance is a polyether polyol that has been synthesized by acidic catalysis. Preferably, it is a polyether polyol that has been synthesized by acidic catalysis and has a number average molecular weight lower than 2.000 Da, preferably between 200 and 1.000 Da and more preferably between 300 and 800 Da.

The polyether carbonate polyol used in the formulation of the invention has a functionality of at least two, preferably from two to eight, even more preferably a functionality of 2 or 3, i.e. two or three hydroxyl groups per molecule. Thus, the polyether carbonate polyol is preferably a polyether carbonate diol or a polyether carbonate triol, even more preferably is a polyether carbonate triol. This functionality coincides with the functionality of the H-functional starter substance used to prepare it.

In a particular embodiment, the equivalent molecular weight of the polyether carbonate polyol is higher than 500 Da, preferably from 1.000 to 45.000 Da, more preferably from 1.000 to 15.000 Da.

Preferably, the polyether carbonate polyol has from 5 to 35 wt % of carbon dioxide (referred to the whole polyether carbonate polyol chain) randomly and covalently incorporated within the chemical structure of the polymer, preferably from 5 to 30 wt %, even more preferably from 5 to 25 wt %, even more preferably from 9 to 25 wt % based on the total weight of the polyether carbonate polyol.

In a preferred embodiment, the polyether carbonate polyol is made by a process comprising copolymerizing one or more H-functional initiator substances, one or more alkylene oxides and carbon dioxide in the presence of a double metal cyanide catalyst, wherein said double metal cyanide catalyst is obtained by a process comprising:
 a) synthesizing a solid double metal cyanide catalyst in the presence of an organic complexing agent and a polyether polyol ligand; and
 b) first washing the catalyst obtained in step a) with an aqueous solution comprising:
  90-100 wt % of water; and
  0-10 wt % of a polyether polyol ligand,
to form a slurry, wherein the aqueous solution does not contain any organic complexing agent other than the polyether polyol ligand.

In a particular embodiment, said process further comprises:
 c) isolating the catalyst from the slurry obtained in step b); and
 d) washing the solid catalyst obtained in step c) with a solution comprising:
  90-100 wt % of an organic complexing agent, and
  0-10 wt % of a polyether polyol ligand.

Step a)

This step can be performed by any method known in the prior art for the synthesis of a DMC catalyst. In a particular embodiment, this step can be carried out by reacting, in an aqueous solution, a water-soluble metal salt (in excess) and a water-soluble metal cyanide salt in the presence of a polyether polyol ligand and an organic complexing agent.

In a preferred embodiment, aqueous solutions of a water-soluble metal salt and a water-soluble metal cyanide salt are first reacted in the presence of the organic complexing agent using efficient mixing to produce a catalyst slurry. The metal salt is used in excess; preferably the molar ratio of metal salt to metal cyanide salt is between 2:1 and 50:1, more preferably between 10:1 and 40:1. This catalyst slurry contains the reaction product of the metal salt and the metal cyanide salt, which is a double metal cyanide compound. Also present are excess metal salt, water, and organic complexing agent, all of which are incorporated to some extent in the catalyst structure. In another preferred embodiment, the mixture of the aqueous solution containing the water-soluble metal salt and the aqueous solution containing the water-soluble metal cyanide salt takes place at a temperature ranging from 30 to 70° C., more preferably from 40 to 60° C., even more preferably at about 50° C.

The water-soluble metal salt preferably has the general formula $MA_n$ wherein:
 M is a cation selected form the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Preferably, M is a cation selected from Zn(II), Fe(II), Ni(II), Mn(II) and Co(II);
 A is an anion selected from the group consisting of halide, hydroxide, sulfate, carbonate, vanadate, cyanide, oxalate, thiocyanate, isocyanate, isothiocyanate, carboxylate and nitrate. Preferably, A is a cation selected from halide; and
 n is 1, 2 or 3 and satisfies the valency state of M.

Examples of suitable metal salts include, but are not limited to, zinc chloride, zinc bromide, zinc acetate, zinc acetonylacetonate, zinc benzoate, zinc nitrate, iron(II) sulfate, iron(II) bromide, cobalt(II) chloride, cobalt(II) thiocyanate, nickel(II) formate, nickel(II) nitrate and the like and mixtures thereof. In a particular embodiment, the water-soluble metal salt is zinc chloride.

The water-soluble metal cyanide salts preferably have the formula $D_x[E_y(CN)_6]$, wherein:
 D is an alkali metal ion or alkaline earth metal ion;
 E is a cation selected from the group consisting of Co(II), Co(III), Fe(II), Fe(III), Mn(II), Mn(III), Cr(II), Cr(III), Ni(II), Ir(III), Rh(III), Ru(II), V(IV) and V(V). Preferably, E is selected from Co(II), Fe(II), Ni(II), Co(III) and Fe(III); and
 x and y are integers greater than or equal to 1, the sum of the charges of x and y balances the charge of the cyanide (CN) group.

Suitable water-soluble metal cyanide salts include, but are not limited to, potassium hexacyanocobaltate (III), potassium hexacyano ferrate (II), potassium hexacyanoferrate (III), calcium hexacyanocobaltate (III), lithium hexacyanocobaltate (III), and the like. In a particular embodiment, the metal cyanide salt is potassium hexacyanocobaltate (III).

The organic complexing agent can be included with either or both of the aqueous salt solutions, or it can be added to the catalyst slurry immediately following precipitation of the DMC compound. It is generally preferred to pre-mix the organic complexing agent with either aqueous solution before combining the reactants. Usually, an excess amount of the complexing agent is used. Typically, the molar ratio of complexing agent to metal cyanide salt is between 10:1 and 100:1, preferably between 10:1 and 50:1, more preferably between 20:1 and 40:1.

Generally, the complexing agent must be relatively soluble in water. Suitable organic complexing agents are those commonly known in the art, for example in U.S. Pat. No. 5,158,922. Preferred organic complexing agents are water-soluble heteroatom-containing organic compounds that can complex with the double metal cyanide compound. According to the present invention, the organic complexing agent is not a polyether polyol. More preferably, the organic complexing agents are water-soluble heteroatom-containing compounds selected from monoalcohols, aldehydes, ketones, ethers, esters, amides, ureas, nitriles, sulfides and mixtures thereof. Preferred organic complexing agents are water-soluble aliphatic alcohols, preferably $C_1$-$C_6$ aliphatic alcohols, selected from the group consisting of ethanol, isopropyl alcohol, n-butyl alcohol, iso-butyl alcohol, sec-butyl alcohol and tert-butyl alcohol. Tert-butyl alcohol (TBA) is particularly preferred.

Preferably, the aqueous metal salt and metal cyanide salt solutions (or their DMC reaction product) are efficiently mixed with the organic complexing agent. A stirrer can be conveniently used to achieve efficient mixing.

Examples of double metal cyanide compounds resulting from this reaction include, for example, zinc hexacyanocobaltate (III), zinc hexacyanoferrate (III), nickel hexacyanoferrate (II), cobalt hexacyanocobaltate (III) and the like. Zinc hexacyanocobaltate (III) is preferred.

The catalyst slurry produced after the mixing of the aqueous solutions in the presence of the organic complexing agent is then combined with a polyether polyol ligand. This step is preferably performed using a stirrer so that an efficient mixture of the catalyst slurry and the polyether polyol takes place.

This mixture is preferably performed at a temperature ranging from 30 to 70° C., more preferably from 40 to 60° C., even more preferably at about 50° C.

Suitable polyether polyols include those produced by ring-opening polymerization of cyclic ethers, and include epoxide polymers, oxetane polymers, tetrahydrofuran polymers and the like. Any method of catalysis can be used to make the polyethers. The polyethers can have any desired end groups, including, for example, hydroxyl, amine, ester, ether or the like. Preferred polyethers are polyether polyols having average hydroxyl functionalities from about 2 to about 8. Also preferred are polyether polyols having a number average molecular weight lower than 2.000 Da, more preferably between 200 and 1.000 Da, even more preferably between 300 and 800 Da. These are usually made by polymerizing epoxides in the presence of active hydrogen-containing initiators and basic, acidic or organometallic catalysts (including DMC catalysts).

Useful polyether polyols include poly(oxypropylene) polyols, ethylene oxide-capped poly(oxypropylene) polyols, mixed ethylene oxide-propylene oxide polyols, butylene oxide polymers, butylene oxide copolymers with ethylene oxide and/or propylene oxide, polytetra methylene ether glycols and the like. Most preferred are poly(oxypropylene) polyols, particularly diols and triols having number average molecular weights lower than 2.000 Da, more preferably between 200 and 1.000 Da, even more preferably between 300 and 800 Da.

More preferably, the polyether polyol used in the preparation of the DMC catalyst has been synthesized by acidic catalysis, i.e. by polymerizing an epoxide in the presence of active hydrogen-containing initiator and acidic catalysts. Examples of suitable acidic catalysts include Lewis acids such as $BF_3$, $SbF_5$, $Y(CF_3SO_3)_3$, or Brönsted acids such as $CF_3SO_3H$, $HBF_4$, $HPF_6$, $HSbF_6$.

In a particular embodiment, the polyether polyol ligand is a poly(oxypropylene) polyol with a number average molecular weight between 200 and 1.000 Da, preferably between 300 and 800 Da, obtained by basic catalysis.

In another embodiment, the polyether polyol ligand is a poly(oxypropylene) polyol with a number average molecular weight between 200 and 1.000 Da, preferably between 300 and 800 Da, obtained by acidic catalysis.

Using a polyether polyol obtained by acidic catalysis in the preparation of the DMC catalyst is preferred. Once the polyether polyol has been combined with the double metal cyanide compound, a polyether polyol-containing solid catalyst is isolated from the catalyst slurry. This is accomplished by any convenient means, such as filtration, centrifugation or the like.

In a particular embodiment, enough reactants are used to give a solid DMC catalyst that contains:
30-80 wt % of the double metal cyanide compound;
1-10 wt % of water;
1-30 wt % of the organic complexing agent; and
1-30 wt % of the polyether polyol ligand.

Preferably, the total amount of the organic complexing agent and the polyether polyol is from 5 to 60 wt % with respect to the total weight of the catalyst, more preferably from 10 to 50 wt %, even more preferably from 15 to 40 wt %.

Step b)

The isolated polyether polyol-containing solid catalyst is then first washed with an aqueous solution comprising 90-100 wt % of water and 0-10 wt % of a polyether polyol. This aqueous solution is absent of any organic complexing agent as those mentioned above. No other washing step is performed before this first washing step once the isolated solid DMC catalyst has been obtained in step a).

The polyether polyol used in step b) is as defined above for step a).

Percentages by weight of the components in the aqueous solution are based on the total weight of said aqueous solution.

Preferably, the amount of polyether polyol ligand in the aqueous solution in step b) is lower than 5 wt % with respect to the total weight of the aqueous solution. According to a further particular embodiment the amount of polyether polyol ligand in the aqueous solution in step b) is lower than 4 wt % with respect to the total weight of solution, preferably lower than 3 wt %. According to a further embodiment, the amount of polyether polyol ligand in the aqueous solution in step b) is between 0.05 and 10 wt % with respect to the total weight of solution, preferably between 0.1 and 2 wt %, more preferably between 0.3 and 1.8 wt %. In a further particular embodiment, the amount of polyether polyol ligand in the aqueous solution in step b) is 0 wt %.

In step b) the water and the polyether polyol ligand can be brought into contact with the catalyst obtained in step a) simultaneously or consecutively. That is, the aqueous solution in step b) can already contain both the water and the polyether polyol ligand when brought into contact with the catalyst obtained in step a) ("simultaneous bringing into contact") or the catalyst obtained in step a) can be first brought into contact with one of the individual components (the water or the polyether polyol ligand) and the resulting mixture then brought into contact with the other individual component ("consecutive bringing into contact"). In a particular embodiment, the water and the polyether polyol ligand are brought into contact with the catalyst obtained in step a) consecutively.

In a preferred embodiment, the catalyst obtained in step a) is first brought into contact with water and then brought into contact with the polyether polyol ligand which is preferably in a 0.1 to 5 wt %, more preferably in 0.1 to 3 wt %, with respect to the total weight of the aqueous solution.

This washing step is generally accomplished by reslurrying the catalyst in the aqueous solution followed by a catalyst isolation step using any convenient means, such as filtration.

It has also been particularly advantageous to use this aqueous solution in the washing step b) in combination with an excess amount of the organic complexing agent in step a) and/or d).

Step d)

Although a single washing step suffices, it is preferred to wash the catalyst more than once. In a preferred embodiment, the subsequent wash is non-aqueous and includes the reslurry of the double metal cyanide catalyst in an organic complexing agent or in a mixture of the organic complexing agent and the polyether polyol used in the previous washing step. More preferably, the double metal cyanide catalyst is washed with a solution comprising 90-100 wt % of the organic complexing agent and 0-10 wt % of the polyether polyol.

The polyether polyol used in step d) is as defined above for step a).

Percentages by weight of the components in the solution are based on the total weight of said solution.

Preferably, the amount of polyether polyol in the solution in step d) is lower than 5 wt % with respect to the total weight of solution. According to a further particular embodiment the amount of polyether polyol ligand is lower than 4 wt % with respect to the total weight of solution, preferably lower than 3 wt %. According to a further embodiment, the amount of polyether polyol in step d) is between 0.05 and 5 wt % with respect to the total weight of solution, preferably between 0.1 and 2 wt %, more preferably between 0.3 and 1.8 wt %.

The organic complexing agent is preferably tert-butyl alcohol. The polyether polyol is preferably a poly(oxypropylene)polyol, more preferably a poly(oxypropylene)polyol having a number average molecular weight lower than 2.000 Da, more preferably from 200 to 1.000 Da or from 300 to 800 Da. In a particular embodiment, the polyether polyol has been synthesized by acidic catalysis.

Typically, the molar ratio of complexing agent to metal cyanide salt is between 10:1 and 200:1, preferably between 20:1 and 150:1, more preferably between 50:1 and 150:1.

In step d) the organic complexing agent and the polyether polyol can be brought into contact with the solid catalyst obtained in step c) simultaneously or consecutively. In a particular embodiment, they are brought into contact with the solid catalyst obtained in step c) consecutively. Preferably, the catalyst obtained in step c) is first brought into contact with the organic complexing agent and then brought into contact with the polyether polyol.

After the catalyst has been washed, it is usually preferred to dry it under vacuum until the catalyst reaches a constant weight. The catalyst can be dried at temperatures within the range of about 50° C. to 120° C., more preferably from 60° C. to 110° C., even more preferably from 90° C. to 110° C. The dry catalyst can be crushed to yield a highly active catalyst in powder form appropriate for use in the co-polymerization process of the invention.

In a particular embodiment, the double metal cyanide compound is zinc hexacyanocobaltate (III), the organic complexing agent is tert-butyl alcohol and the polyether polyol is a poly(oxypropylene) polyol. Preferably the polyether polyol is a poly(oxypropylene)polyol, more preferably a poly(oxypropylene)polyol having a number average molecular weight lower than 2.000 Da, more preferably from 200 to 1.000 Da or from 300 to 800 Da. In a particular embodiment, the polyether polyol has been synthesized by acidic catalysis.

In a particular embodiment, the catalyst obtainable by the above process is also characterized by comprising:

at least one double metal cyanide compound;
at least one organic complexing agent; and
at least one polyether polyol ligand having a number average molecular weight lower than 2.000 Da.

In a particular embodiment, the double metal cyanide compound is zinc hexacyanocobaltate (III), the organic complexing agent is tert-butyl alcohol and the polyether polyol has a number average molecular weight lower than 2.000 Da. Most preferred the polyether polyol is a poly(oxypropylene) polyol, particularly a diol or triol having number average molecular weight between 200 and 1.000 Da, more preferably between 300 and 800 Da.

In a particular embodiment, the organic complexing agent is tert-butyl alcohol and the polyether polyol has been synthesized by acidic catalysis. Preferably, the organic complexing agent is tert-butyl alcohol and the polyether polyol has a number average molecular weight lower than 2.000 Da, preferably between 200 and 1.000 Da, more preferably between 300 and 800 Da, and has been synthesized by acidic catalysis.

In another embodiment, the organic complexing agent is tert-butyl alcohol and the polyether polyol has been synthesized by basic catalysis. Preferably, the organic complexing agent is tert-butyl alcohol and the polyether polyol has a number average molecular weight lower than 2.000 Da, preferably between 200 and 1.000 Da, more preferably between 300 and 800 Da, and has been synthesized by basic catalysis.

In a particular embodiment, the double metal cyanide catalyst obtainable by the above process comprises:
30-80 wt % of the double metal cyanide compound;
1-10 wt % of water;
1-30 wt % of the organic complexing agent; and
1-30 wt % of the polyether polyol ligand.

Preferably, the total amount of the organic complexing agent and the polyether polyol is from 5 to 60 wt % with respect to the total weight of the catalyst, more preferably from 10 to 50 wt %, even more preferably from 15 to 40 wt %.

In a particular embodiment, the formulation of the invention comprises:
a) 55-95 wt % of a polyalkylene carbonate having a weight average molecular weight equal to or higher than 17.000 Da;
b) 5-45 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol; and
c) optionally, less than 30 wt % of a tackifying resin,
wherein the weight percentages of the components a), b) and c) of the formulation are based on the total weight of the formulation, provided that said formulation does not contain any reticulating agent.

In this particular embodiment, the polyalkylene carbonate is selected from polypropylene carbonate, polyethylene carbonate and mixtures thereof. More preferably, the polyalkylene carbonate is polypropylene carbonate or polyethylene carbonate.

In a preferred embodiment, the formulation of the invention comprises:
a) 75-95 wt % of polyalkylene carbonate having a weight average molecular weight equal to or higher than 17.000;
b) 5-25 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol; and c) optionally, less than 10 wt % of a tackifying resin, wherein the weight percentages of the components a), b) and c) of the formulation are based on the total weight of the formulation, provided that said formulation does not contain any reticulating agent.

In this particular embodiment, the polyalkylene carbonate is selected from polypropylene carbonate, polyethylene carbonate and mixtures thereof. More preferably, the polyalkylene carbonate is polypropylene carbonate or polyethylene carbonate.

In another preferred embodiment, the formulation of the invention comprises:

a) 75-95 wt % of polylakylene carbonate having a weight average molecular weight equal to or higher than 17.000 Da;

b) 5-25 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol;

wherein the weight percentages of the components a), b) and c) of the formulation are based on the total weight of the formulation, provided that said formulation does not contain any reticulating agent.

In this particular embodiment, the polyalkylene carbonate is selected from polypropylene carbonate, polyethylene carbonate and mixtures thereof. More preferably, the polyalkylene carbonate is polypropylene carbonate or polyethylene carbonate.

The improved miscibility of the components a) and b) provides the required stickiness to the formulation in order for it to be used as a pressure sensitive adhesive, without the need of tackifying resins or reticulating agents.

Tackifying Resin

A tackifying resin can be optionally incorporated to the formulation of the invention in weight proportions ranging from 0 to 30 wt %, more preferably up to 15 wt %, even more preferably up to 10% by weight based on the total weight of the formulation.

In a particular embodiment, the formulation of the invention does not include a tackifying resin.

The term tackifying resin is well recognized in the art and includes those substances that provide tack to an adhesive formulation.

Resins compatible with the other components of the formulation are preferred and especially those with a low acid number, preferably less than 5, more preferably less than 1, and low reactivity towards the components of the formulation. Examples of suitable resins include rosin resins, hydrocarbon resins, terpene resins and derivatives thereof.

In a particular embodiment, the tackifying resin is selected from rosin resins (also known as colophony resins), rosin ester resins, fully or partly hydrogenated rosin resins, fully or partly hydrogenated rosin ester resins, disproportionated rosin resins, disproportionated rosin ester resins; aromatic, aliphatic or cycloaliphatic hydrocarbon resins or derivatives thereof; fully or partly hydrogenated aromatic, aliphatic or cycloaliphatic hydrocarbon resins; terpene resins, terpene polymers and copolymers, terpene phenolic resins and hydrogenated derivatives thereof.

In a preferred embodiment, the tackifying resin is a rosin resin or a derivative thereof. Preferably, it is selected from rosin resin, fully or partly hydrogenated rosin resin, disproportionated rosin resin, rosin ester resin, fully or partly hydrogenated rosin ester resin and disproportionated rosin ester resin. Even more preferably the tackifying resin is a hydrogenated rosin ester resin, such as glycerol ester of hydrogenated rosin resin.

In another preferred embodiment, the tackifying resin is a mixture of a rosin resin or a derivative thereof and a hydrocarbon resin or a derivative thereof, as defined above.

A second aspect of the present invention refers to a process for the preparation of the formulation of the invention, said process comprises the mixture of the polyalkylene carbonate, the polyether carbonate polyol and, optionally, the tackifying resin until a homogeneous mixture is obtained. Particularly, the components are mixed in the predetermined weight proportions during the required time to obtain the homogeneous mixture.

The components of the formulation of the invention can be mixed following ordinary processes in the art such as those described in Encyclopedia of Polymer Science and Engineering, 2nd Ed., vol. 14, Polymer Blends chapter, page 9. Procedures well known to the skilled person include combining solutions of the mixed components, by roller mixing or by compounding in an extruder or kneader and the like.

In one embodiment, the polyalkylene carbonate, the polyether carbonate polyol and, optionally the tackifying resin, are mixed in a mixer or chamber, such as a Haake chamber, at temperatures sufficient to molten the polymers, for example ranging from 20° C. to 250° C., typically between 100° C. and 200° C., during the time necessary to obtain a homogeneous mixture.

In another embodiment of the invention, the components of the formulation of the invention are mixed in a suitable solvent. Any solvent that can dissolve all the components is appropriate, and those which are volatile are preferred (e.g. THF, dichloromethane or acetone). After mixing is complete, the solvent is removed to provide the mixture.

In a particular embodiment, the polyalkylene carbonate is added to the mixture in a weight proportion between 40% and 95%, more preferably from 55 to 95 wt %, even more preferably from 75 to 95 wt %, with respect to the total weight of the mixture.

In a preferred embodiment, the polyalkylene carbonate is selected from polypropylene carbonate, polyethylene carbonate and mixtures thereof. More preferably, the polyalkylene carbonate is polypropylene carbonate or polyethylene carbonate.

In another preferred embodiment, the polyether carbonate polyol is added to the mixture in a weight proportion between 5% and 60%, more preferably from 5 to 45 wt %, even more preferably from 5 to 25 wt %, with respect to the total weight of the mixture.

The components of the formulation of the invention exhibit an improved miscibility and thermal stability when they are compared to a formulation comprising a polypropylene carbonate and other polyol, such as a polyether polyol having no $CO_2$ content, a polyol ester or a polycarbonate polyol.

As mentioned above, the improved miscibility of the components provides the required stickiness to the formulation in order for it to be used as a pressure sensitive adhesive, without the need of tackifying resins or reticulating agents.

Moreover, the incorporation of the polyether carbonate polyol to polypropylene carbonate improves the thermal stability of polypropylene carbonate which has a degradation temperature relatively low. Surprisingly, this improved stability is remarkably higher when compared to the case in which other polyol, such as a polyether polyol without any content of $CO_2$, a polyol ester or a polycarbonate polyol is mixed with the polyalkylene carbonate.

Additionally, the total content of $CO_2$ in the mixture is increased with the subsequent improvement in its sustainability.

Furthermore, the resulting mixture provides a material having self-healing properties being able, after being cut, to self-mend by simple contact at room temperature.

A further aspect of the present invention refers to a pressure sensitive adhesive comprising the formulation as described above. Thus, the invention also provides a pressure sensitive adhesive which comprises a formulation comprising:
 a) 40-95 wt % of polyalkylene carbonate having a weight average molecular weight equal to or higher than 17.000 Da;
 b) 5-60 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol; and
 c) optionally, less than 30 wt % of a tackifying resin, wherein the weight percentages of the components a), b) and c) of the formulation are based on the total weight of the formulation; provided that said formulation does not contain any reticulating agent.

The pressure sensitive adhesive of the invention is a sticky viscous liquid which may be readily extruded or applied onto a substrate surface, to wet-out on the said surface and penetrate somewhat into porous surfaces, providing a good basis for adhesion to the substrate. Thus, the pressure sensitive adhesive of the present invention may be simply applied, as by brush or extrusion nozzle to provide a deposited layer on a substrate surface which automatically converts to a cohesive tacky layer strongly adherent to the substrate.

Although suitable pressure sensitive adhesives can be obtained with the formulation of the invention without the need of plasticizers, said adhesive can also include plasticizers to improve levels of adhesion and/or processing and service properties, e.g. viscosity or flexibility.

Therefore, in another particular embodiment, the pressure sensitive adhesive of the invention further comprises 0.1 to 5 wt % of at least one plasticizer, based on the total weight of the adhesive formulation. Preferably, it comprises from 0.5 to 5 wt %, more preferably from 1 to 5 wt % of at least one plasticizer.

Such plasticizers should be free of water and compatible with the components of the adhesive formulation. In a particular embodiment, the at least one plasticizer is selected from medicinal white oils, mineral oils, vegetal or animal oils, alkyl esters of aliphatic or aromatic carboxylic acids, such as adipates, sebacates, phthalates, citrates, benzoates, mellitates and aromatic sulphonates, alcohols, glycols or polyols, including polyether polyols and polyester polyols, and mixtures thereof.

The plasticizer is added to the composition in a sufficient amount to provide the desired rheological properties, particularly viscosity or flexibility, and to disperse any catalyst that may be present in the system.

In addition to the components mentioned above, customary auxiliaries and/or additives can also be added to the adhesive formulation.

In a particular embodiment, the pressure sensitive adhesive comprises 0 to 5 wt % of one or more further additives, based on the total weight of the adhesive formulation. More particularly, it comprises from 0.01 to 5 wt % of one or more further additives, preferably from 0.01 to 3 wt %, more preferably from 0.05 to 2 wt %, even more preferably from 0.05 to 0.5 wt %.

Such additives may include, but are not limited to, antioxidants, lubricants, stabilizers, colorants, flame retardants, inorganic and/or organic fillers and reinforcing agents.

In a particular embodiment, the pressure sensitive adhesive of the invention comprises 0 to 5 wt. % of at least one antioxidant, based on the total weight of the adhesive composition. More particularly, it comprises from 0.01 to 5 wt. % of at least one antioxidant, preferably from 0.01 to 3 wt. %, more preferably from 0.05 to 2 wt. %, even more preferably from 0.05 to 0.5 wt. %.

In an embodiment, the at least one antioxidant is selected from sterically hindered phenols, phosphites and mixtures thereof. Preferably, it is a mixture of a sterically hindered phenol and a phosphite.

Sterically hindered phenols are well known in the art and refer to phenolic compounds which contain sterically bulky radicals, such as tert-butyl, in close proximity to the phenolic hydroxyl group thereof. In particular, they may be characterized by phenolic compounds substituted with tert-butyl groups in at least one of the ortho positions relative to the phenolic hydroxyl group. In a particular embodiment, the sterically hindered phenol has tert-butyl groups in both ortho-positions with respect to the hydroxyl group. Representative hindered phenols include pentaerythritol tetrakis (3-(3,5-di-tert-butyl-4-hydroxyphenyl)propionate), 1,3,5-trimethyl-2,4,6-tris (3,5-di-tert-butyl-4-hydroxybenzyl)benzene, n-octadecyl-3 (3,5-di-tert-butyl-4-hydroxyphenyl) propionate, 4,4'-rnethylenebis(4-rnethyl-6-tert-butylphenol), 4,4'-thiobis(6-tert-butyl-o-cresol), 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, and sorbitol hexa-(3,3,5-di-tert-butyl-4-hydroxy-phenyl) propionate.

In a particular embodiment, phosphites are aromatically substituted phosphites, preferably substituted or unsubstituted triphenyl phosphites. Examples of these phosphites include triphenyl phosphite, trisnonylphenyl phosphite, and tris(2,4-di-tert-butylphenyl)-phosphite.

In a particular embodiment, the pressure sensitive adhesive of the invention comprises from 0.05 to 0.5 wt. % of at least one antioxidant selected from sterically hindered phenols, aromatically substituted phosphites and mixtures thereof. In an embodiment, the antioxidant is a mixture of a sterically hindered phenol and an aromatically substituted phosphite, e.g. a mixture of pentaerythritol tetrakis(3-(3,5-di-tert-butyl-4-hydroxyphenyl)propionate) and tris(2,4-di-tert-butylphenyl)-phosphite.

As lubricants, non-reactive liquids can be used to soften the pressure sensitive adhesive or to reduce its viscosity for improved processing. Examples of lubricants include fatty acid esters and/or fatty acid amides.

Stabilizers may include oxidation stabilizers, hydrolysis stabilizers and/or UV stabilizers. Examples of hydrolysis stabilizers include oligomeric and/or polymeric aliphatic or aromatic carbodiimides. As UV stabilizers, hydroxybenzotriazoles, zinc dibutyl thiocarbamate, 2,6-ditertiary butylcatechol, hydroxybenzophenones, hindered amines and phosphites can be used to improve the light stability of the PSA formulation. Color pigments have also been used for this purpose.

The pressure sensitive adhesive of the invention may further comprise one or more suitable colorants. Typical inorganic coloring agents include, but are not limited to, titanium dioxide, iron oxides and chromium oxides. Organic pigments may include azo/diazo dyes, phthalocyanines and dioxazines as well as carbon black.

The pressure sensitive adhesive formulation of the invention may further comprise one or more suitable flame retardants to reduce flammability. The choice of flame retardant often depends on the intended service application of the formulation and the attendant flammability testing scenario governing that application. Examples of such flame retardants include chlorinated phosphate esters, chlorinated paraffins and melamine powders.

Optional additives of the pressure sensitive adhesive formulation of the invention include fillers. Such fillers are well known to those skilled in the art and include, but are not limited to, carbon black, titanium dioxide, calcium carbonate, surface treated silicas, titanium oxide, fume silica, talc, aluminium trihydrate and the like. In certain embodiment, a reinforcing filler is used in sufficient amount to increase the strength of the composition and/or to provide thixotropic properties to the composition.

Other optional additive to be used in the adhesive formulation of the invention includes clays. Suitable clays include, but are not limited to, kaolin, surface treated kaolin, calcined kaolin, aluminum silicates and surface treated anhydrous aluminum silicates. The clays can be used in any form. Preferably, the clay is in the form of pulverized powder, spray-dried beads or finely ground particles.

The adhesive formulation of the present invention may further include waxes as optional additive. Useful waxes include e.g. paraffin waxes, microcrystalline and macrocrystalline waxes, Fischer-Tropsch waxes, oxidized Fischer-Tropsch waxes, polyethylene and by-products of polyethylene wherein Mw is less than 3.000, propylene waxes, and functionalized waxes such as hydroxy stearamide and fatty amide waxes. Also suitable are ultra-low molecular weight ethylene/alpha-olefin interpolymers prepared using a constrained geometry (e.g. metallocene) catalyst, which may be referred to as homogeneous waxes. The amount of wax to be added is calculated so that the viscosity is lowered to a desired range without adversely affected the adhesive properties of the formulation.

The pressure sensitive adhesive of the invention can be applied as a thin coating to a variety of substrates. After application of the adhesive composition to provide a layer on a substrate surface of adequate thickness, preferably from 0.05 to 0.3 mm, it soon forms a soft, elastic mass having good contact adhesion characteristics. In particular, the adhesive exhibits a tackiness that remains at a high level for periods higher than three months and good quality bonds may be made during this period by simple application of light pressure to a substrate placed against the layer without application of other inducements, such as heat. As pointed out in the experimental part, the pressure sensitive adhesive according to this invention has been found to have good pressure sensitive characteristics which provide bonds exhibiting good adhesion and peel strength.

In a particular embodiment of the invention, the pressure sensitive adhesive of the invention is a hot melt pressure sensitive adhesive. This adhesive does not solidify to form a hard material but remains permanently tacky and have the ability to wet-out substrates on contact. The bonds are formed by bringing the adhesive in contact with the substrate and applying pressure.

The pressure sensitive adhesive of the present invention can be prepared by conventional methods, for example, by mixing the components of the adhesive formulation. Said components can be mixed in a mixer or chamber, such as a Haake chamber, at temperatures sufficient to molten the polymers, for example ranging from 20° C. to 250° C., typically between 100° C. and 200° C., during the time necessary to obtain a homogeneous mixture. The different additives, if any, can be added before or after mixing the polyalkylene carbonate, the polyether carbonate polyol and, optionally, the tackifying resin.

This process can be carried out in an extruder.

The pressure sensitive adhesive can also be obtained in the form of a film by means of a mixture of all components in solution, for example by solution casting from a solvent, such as chloroform, subsequent drying under vacuum at a temperature from 50° C. to 100° C. to constant weight.

Another aspect of the present invention relates to the use of the pressure sensitive adhesive to bond substrates. Preferably, the adhesive can be detached again from the substrate surface. Thus, also preferably the adhesive is used to reversibly bond two substrates.

The adhesive may be used to bond a variety of substrates. These substrates may be flexible or, alternatively, rigid. In a particular embodiment, one of the substrates to be bonded is thin and flexible, preferably in the form of films, multi-layer films, paper, aluminium, or multi-layer constructions from paper, aluminium and polymer films.

The pressure sensitive adhesive according to the invention can be used to bond substrates such as glass, metal, ceramic, wood, coated or uncoated paper, paperboard packaging and plastics, such as polyethylene terephthalate (PET), polyethylene naphthalate (PEN), polyamide (PA), polyethylene (PE), polypropylene (PP), polyvinyl chloride (PVC) and polystyrene (PS). Thin flexible substrates such as films, multi-layer films or paper can then be glued to such solid substrates.

The adhesive composition of the invention is preferably used to bond plastic substrates, particularly substrates made of polyethylene, polypropylene, polystyrene, polyvinyl chloride, polyethylene terephthalate, polyamide, polyethylene naphthalate or cellophane.

In a particular embodiment, the adhesive of the invention is used for reversible bonding of two flexible substrates. The invention further provides the bonded, preferably reversibly bonded, substrates comprising the pressure sensitive adhesive of the invention.

In an embodiment, the adhesive of the invention is used in the manufacture of packaging or parts of packaging such as lids, trays, containers, pouches, flow packs or blisters for food, pharmaceuticals, cosmetics as well as industrial applications. In a particular embodiment, the adhesive of the invention is used in the manufacture of resealable packaging or parts of resealable packaging for food products.

Resealable packages generally comprise a container (e.g. a tray) to which a multilayer film structure is welded. This multilayer film comprises a welding layer (generally made of polyethylene or polypropylene), an adhesive layer and an upper layer (generally made of PE, PET, PA, OPA, OPP, etc., generally forming a barrier), optionally with a binder layer between these layers thus giving rise to a three- or five-layer film, respectively.

Therefore, in another aspect, the invention is directed to a multilayer film comprising the adhesive of the invention.

These multilayer film structures can be obtained by conventional means widely known by those skilled in the art.

Another aspect of the present invention relates to the use of the multilayer film as defined above to bond substrates.

In another aspect, the invention is directed to a resealable package, or parts of a resealable package, comprising the pressure sensitive adhesive or the multilayer film according to the invention.

In a particular embodiment, the resealable package or parts of a resealable package are selected from a tray, a container, a bag, a pouch, a lid and a blister.

The pressure sensitive adhesive of the invention can also be used for the manufacture of self-adhesive sealing compositions, insulating materials and the like. Shaped articles, such as panels made from the adhesive, are contact adhesive at their surface, whereas the rest of the article is solid and elastic.

As mentioned above, the formulation of the invention has the capability of repairing itself in its intrinsic environment as soon as damage occurs. Such damage is, for example, a cut, a break at the surface or interior of a material. Thus, said formulation may prevent or stop the propagation of the damage and extend the lifetime of the repaired material. Said material can be already made by said self-healing formulation or can be a material to which said self-healing formulation is added.

Due to the self-healing capability of the formulation of the invention, it can also be used for the manufacture of binding materials, self-healing elastic materials, self-healing polyurethane foams, self-healing joints, adhesives, interior surfaces, coverings for roofs, walls, floors, home applications, etc. and, in general, for improving the damage tolerance in load bearing structures.

Structures that make use of the formulation of the invention may produce a healing response from a change in the material's chain mobility as a function of the damage mechanism/condition involved. Thus, the formulation of the invention has application in aircraft and aerospace applications as well as in other pressure loaded type structures.

Other potential applications for the formulation fo the invention include, but are not limited to, protective liners, radiation shielding, fuel tank liners, encasing for hydraulics, encasings for fuel lines and wire insulation material.

The following examples merely illustrate the invention. Those skilled in the art will recognize many variations that can be performed without altering the functioning of the invention.

EXAMPLES

Example 1. Preparation of Pressure Sensitive Adhesives

Different adhesive formulations containing a polyalkylene carbonate (PAC), polyether carbonate polyol and tackifying resin (if any) were prepared according to the procedure detailed below.

Polyalkylene carbonates (PAC), either polypropylene carbonate (PPC) or polyethylene carbonate (PEC), used to prepare the different samples have the following properties:

TABLE 1

| PAC | Mw (Da) | PDI | Tg (° C.) | carbonate linkages (%) |
|---|---|---|---|---|
| PPC1 | 120.000 | 5 | 19 | >75 |
| PPC2 | 20.000 | 2 | 24 | >89 |

TABLE 1-continued

| PAC | Mw (Da) | PDI | Tg (° C.) | carbonate linkages (%) |
|---|---|---|---|---|
| PPC3 | 150.000 | 1.7 | 38 | >89 |
| PEC1 | 240.000 | 3.3 | 18 | >89 |

PPC1 and PEC1 were supplied by Empower Materials as QPAC40 and QPAC25, whereas PPC2 and PPC3 were experimental material prepared according to the procedures described in *Angew. Chem. Int.*, 2003, 42, 5484-5487; *Angew. Chem. Int.*, 2004, 43, 6618-6639; *Macromolecules*, 2010, 43, 7398-7401.

The glass transition temperature (Tg) was taken from the second heating in differential scanning calorimeter (DSC) experiments according to the following procedure. Non-isothermal (10° C./min from −85 to 200° C.) experiments were carried out using a DSC TA Instruments Q2000 under nitrogen flow, operating with an intra-cooler under nitrogen flow. Temperature and heat flow calibrations were performed with indium as standard.

Polyether carbonate polyols (POPC) used to prepare the different samples have the following properties:

TABLE 2

| POPC | Equivalent Molecular Weight (Da) | PDI | $CO_2$ content (wt %) |
|---|---|---|---|
| PolyolPC 1 (triol) | 1.200 | 1.5 | 19.3 |
| PolyolPC 2 (diol) | 3.000 | 2.2 | 16.9 |
| PolyolPC 3 (diol) | 10.200 | 4.4 | 24.7 |

These polyether carbonate polyols can be obtained according to the procedures described, for example, in patent application WO2015/022290.

Weight-average molecular weights (Mw) and polydispersity indices (Mw/Mn) of polyalkylene carbonates and polyether carbonate polyols were determined against PEG standards by gel-permeation chromatography (GPC) using a Bruker 3800 equipped with a deflection RI detector. Tetrahydrofuran at 1 mL/min flow rate was used as eluent at room temperature.

For comparative purposes, other polyols, such as a polyether polyol without any content of $CO_2$, a polyester polyol as well as a polycarbonate diol, were also used to prepare comparative compositions:

TABLE 3

| Polyol | Equivalent Molecular Weight (Da) |
|---|---|
| Polyether polyol (triol) (comparative 1) | 1.100 |
| Polyol ester (diol) P-6010 (Kuraray) (comparative 2) | 3.000 |
| Polycarbonate diol C-3090 (Kuraray) (comparative 3) | 1.500 |

The polycarbonate diol used as comparative compound 3 is characterized for having a carbonate group in each monomeric unit.

The molar amount of $CO_2$ incorporated in the resulting polyether carbonate polyol was determined by means of 1H-NMR (Bruker AV III HD 500, 500 MHz, pulse program zg30, waiting time d1: 1s, 120 scans). The sample was dissolved in deuterated chloroform. The relevant resonances in the $^1$H-NMR (based on TMS=0 ppm) are as follows:

Cyclic carbonate=1.50 ppm (3H); Polyether carbonate polyol=1.35-1.25 ppm (3H); Polyether polyol: 1.25-1.05 ppm (3H).

Taking into account the relative intensities, the polymer-bonded carbonate (linear carbonate, LC) in the reaction mixture was converted to mol % according to the following formula (I):

$$LC = F(1.35\text{-}1.25) \times 100/(F(1.50) + F(1.35\text{-}1.25) + F(1.25\text{-}1.05)) \quad (I)$$

wherein:
F(1.50): resonance area at 1.50 ppm for cyclic carbonate (corresponds to 3H atoms);
F(1.35-1.25): resonance area at 1.35-1.25 ppm for polyether carbonate polyol (corresponds to 3H atoms);
F(1.25-1.05): resonance area at 1.25-1.05 ppm for polyether polyol (corresponds to 3H atoms).

The amount by weight (in wt. %) of polymer bonded carbonate (LC*) in the reaction mixture was calculated according to formula (II):

$$LC^* = F(1.35\text{-}1.25) \times 102 \times 100/N \quad (II)$$

wherein the value for N ("denominator" N) was calculated according to formula (III):

$$N = F(1.35\text{-}1.25) \times 102 + F(1.50) \times 102 + F(1.25\text{-}1.05) \times 58 \quad (III)$$

The factor 102 results from the sum of the molar mass of $CO_2$ (molar mass 44 g/mol) and of propylene oxide (molar mass 58 g/mol), whereas the factor 58 results from the molar mass of propylene oxide which must be adjusted in each case according to the alkylene oxide used.

The amount by weight (in wt. %) of $CO_2$ in polymer was calculated according to formula (IV):

$$\% \ CO_2 \ \text{in polymer} = LCp \times 44/102 \quad (IV)$$

wherein the value for LCp was calculated according to formula (V):

$$LCp = F(1.35\text{-}1.25) \times 102 \times 100/Np \quad (V)$$

Wherein the value for Np mas calculated according to formula (VI):

$$Np = F(1.35\text{-}1.25) \times 102 + F(1.25\text{-}1.05) \times 58 \quad (VI)$$

The factor 102 results from the sum of the molar masses of $CO_2$ (molar mass 44 g/mol) and of propylene oxide (molar mass 58 g/mol), whereas the factor 58 results from the molar mass of propylene oxide, which must be adjusted in each case according to the alkylene oxide used.

The tackifying resin was that commercially available under the name Foralyn 90 (Eastman).

Pressure sensitive adhesives were prepared by mixing the polyalkylene carbonate, the polyether carbonate polyol, and the tackifying resin (if any) in the quantities listed in Table 4 below.

In particular, samples 1 to 6 were prepared by solution casting from chloroform, i.e., by mixing the polypropylene carbonate, the polyether carbonate polyol and the tackifying resin, if any, in chloroform, and dried under vacuum at 80° C. to constant weight so as films were obtained.

Samples 7 to 12 were obtained by mixing the polypropylene carbonate and the polyether carbonate polyol in a Haake chamber until a melted homogenous mixture is obtained, typically at a temperature of approximately 170° C. and 50 rpm for at least 8 min.

Once the mixtures were obtained, samples were prepared by depositing about 2 g of the obtained mixture on a steel plate (7×7×0.01 cm) which was heated at 180° C. and then allowed to cool on a smooth surface to give a homogeneous film thickness.

For comparative purposes, a commercial pressure sensitive adhesive marketed under the tradename Post it® supplied by 3M and samples containing polypropylene carbonate (PPC1) and:

a polyether polyol (without any content of $CO_2$);

a polyol ester; or a polycarbonate diol (having a carbonate group in each monomeric unit), were also tested in the same conditions as described below. Post it® was selected as a comparative example for being the most widely known commercial resealable pressure sensitive adhesive.

The comparative samples containing polypropylene carbonate (PPC1) and: (i) polyether polyol, (ii) polyol ester or (iii) polycarbonate diol were also prepared in the same conditions as those used for samples 7 to 12, i.e., by mixing the polypropylene carbonate and the polyol in a Haake chamber until a melted homogenous mixture is obtained, particularly at a temperature of approximately 170° C. and 50 rpm for at least 8 min.

TABLE 4

Composition of the mixtures.

| Sample | PPC | POPC | Resin | PPC (wt %) | POPC (wt %) | Resin (wt %) |
|---|---|---|---|---|---|---|
| Sample 1 | PPC1 | PolyolPC 1 | Foralyn 90 | 61.6 | 10 | 28.4 |
| Sample 2 | PPC1 | PolyolPC 1 | Foralyn 90 | 58.2 | 15 | 26.8 |
| Sample 3 | PPC1 | PolyolPC 1 | Foralyn 90 | 74.6 | 5.8 | 20 |
| Sample 4 | PPC1 | PolyolPC 1 | Foralyn 90 | 74.6 | 5.4 | 25 |
| Sample 5 | PPC1 | PolyolPC 1 | | 60 | 40 | 0 |
| Sample 6 | PPC3 | PolyolPC 1 | Foralyn 90 | 74.4 | 5.7 | 19.9 |
| Sample 7 | PPC3 | PolyolPC 2 | | 80 | 20 | 0 |
| Sample 8 | PPC1 | PolyolPC 2 | | 90 | 10 | 0 |
| Sample 9 | PPC1 | PolyolPC 2 | | 80 | 20 | 0 |
| Sample 10 | PPC1 | PolyolPC 3 | | 80 | 20 | 0 |
| Sample 11 | PPC1 | PolyolPC 1 | | 90 | 10 | 0 |
| Sample 12 | PEC1 | PolyolPC 2 | | 60 | 40 | |
| Comparative 1 PPC + polyether polyol | PPC1 | Polyol | | 80 | 20 | 0 |
| Comparative 2 PPC + polyol ester | PPC1 | P-6010 | | 80 | 20 | 0 |
| Comparative 3 PPC + polycarbonate diol | PPC1 | C-3090 | | 80 | 20 | 0 |

Example 2. Measurement of Stability and Adhesive Properties

Thermogravimetry

A Mettler TGA instrument was used for the thermogravimetric measurements. Non-isothermal experiments were performed in the temperature range 30-700° C., at heating rate of 5° C./min in nitrogen atmosphere. TGA value is taken from the first maximum of the derivative thermogravimetric curves (DTG).

Tack Measurements

For the measurement of hot tack texture, a TA.XT2i Texture Analyzer (Stable Microsystems, Surrey, England) was used. Each sample was placed in a thermally insulated chamber covered with aluminum, wherein temperature can be controlled by an external thermocouple. Measurement of tackiness (also referred to as tack) was performed at different temperatures between 23° C. and 100° C., the temperature being determined by a thermocouple placed in contact with the sample.

A cylindrical stainless steel rod (3 mm diameter) with smooth contact was used to measure the peeling force necessary to separate from the adhesive. The testing experimental conditions were the following:
   approach speed of the rod to the sample: 0.1 mm/s
   force applied to the sample: 5 N
   time of application force: 1 s
   separation speed of the rod from the sample: 1 mm/s
   Peeling from Canvas Tests The adhesive properties under T-peeling strain were tested in canvas-hot melt-canvas adhesive bonds. Canvas is a porous material with a texture similar to cardboard and edge-books which are commonly bonded with hot melt adhesives.

For the adhesive bonds with canvas, 30×150 mm probes were used, without any surface treatment, using the non-painted side of the canvas.

The adhesive was applied at 180° C. with a spreader (the temperature was controlled by means of a Brookfiled Thermosel device) on the surface of one of the two probes to be bonded. Subsequently, the probes were bonded by applying a pressure of 0.88 MPa for 10 seconds. The pressure was applied by means of a hydraulic press.

The T-peeling tests were performed 1 hour after having conducted the adhesive bonds using a universal testing machine Instron 4411 (Instron Espana and Portugal, Cerdanyola, Barcelona, Spain) at a peeling rate of 10 mm/min. The type of failure of the separated surfaces was determined visually.

Shear Adhesion Tests

To assess the adhesive properties of the adhesive formulations, shear adhesion tests were performed. For doing that, aluminium-hot melt-aluminium adhesive bonds were prepared. Prior to performing the adhesive bonds, the surfaces of the metal to be bonded were treated by a mechanical friction treatment consisting of scratching the surface with a scourer (Scotch Brite®) to improve the roughness of said surface, followed by cleaning it with isopropanol to remove surface contaminants, and leaving the solvent to evaporate for at least 30 minutes.

Once the surface treatment were performed, an adhesive droplet was applied at 180° C. on one of the aluminium probes to be bonded and, subsequently, the other aluminium probe was placed above, applying a 2 kg weight over the bond (equivalent to a pressure of 65.3 KPa) for 10 seconds. The temperature at which the adhesive is applied was controlled by means of a Brookfield Thermosel device. The bonds were left to cool for 1 hour at room temperature.

Then, the shear adhesion tests were performed using a universal testing machine Instron 8516 (Instron, Buckinghamshire, England) at a clamp displacement rate of 10 mm/min.

The results given in table 5 correspond to an average from 5 trials and the type of failure of the separated surfaces was determined visually.

Table 5 below shows the experimental data of the adhesive properties of the different samples:

| Sample | Tack Maximum (KPa) | Tack Maximum Temperature (° C.) | Peeling from canvas (N/m) | Shear adhesion (KPa) |
|---|---|---|---|---|
| Sample 1 | 191 | 65 | | 185 |
| Sample 2 | 179 | 55 | | |
| Sample 3 | 140 | 55 | | |
| Sample 4 | 188 | 55 | | |
| Sample 5 | 128 | 55 | | 190 |
| Sample 6 | 140 | 80 | | |
| Sample 7 | 100 | 65 | | |
| Sample 8 | 206 | 55 | | |
| Sample 9 | 260 | 40 | | |
| Sample 10 | 275 | 75 | 191 | 803 |
| Sample 11 | | | 173 | 627 |
| Sample 12 | 200 | 25 | | |
| Post it ® 3M | 18 | 25 | | |
| Comparative 1 PPC + polyether polyol | Low tack (<10) | 25 | | |

As can be observed from the experimental results, the composition according to the present invention provides a pressure sensitive adhesive with improved adhesion properties, particularly an improved stickiness, when compared to commercial pressure sensitive adhesives or mixtures having a polyether polyol without any content of $CO_2$, even when no tackifying resin is added or low amounts of said resin are used in the formulations.

Furthermore, as derivable from FIG. 1, the incorporation of the polyether carbonate polyol to polyalkylene carbonate also improves the thermal stability of polyalkylene carbonate which has a degradation temperature relatively low.

When compared to a mixture containing a polyalkylene carbonate with a polyol ester or a polycarbonate polyol, also improved adhesion properties are obtained as well as an enhanced thermal stability as higher degradation temperatures are observed (see table 6). Furthermore, a migration of the polyol ester and the polycarbonate diol to the surface of the mixture is observed conferring the mixture with an oily appearance which evidences the incompatibility of its components.

TABLE 6

| Sample | Shear adhesion (KPa) | Degradation temperature (° C.) |
|---|---|---|
| Sample 10 | 803 | 268 |
| Sample 11 | 627 | 275 |
| Comparative 2 PPC + polyol ester | 55 | 241 |
| Comparative 3 PPC + polycarbonate diol | 33 | 247 |

Example 3. Tensile Strength Measurements

Figure 2:
FIG. 2 shows (a) a photograph of the dumbbell-shaped sample used to perform the tensile strength measurements which was cut in half; (b) the dimensions of the said dumbbell-shaped sample which are according to ISO 37 type 2 standard.
Figure 2:
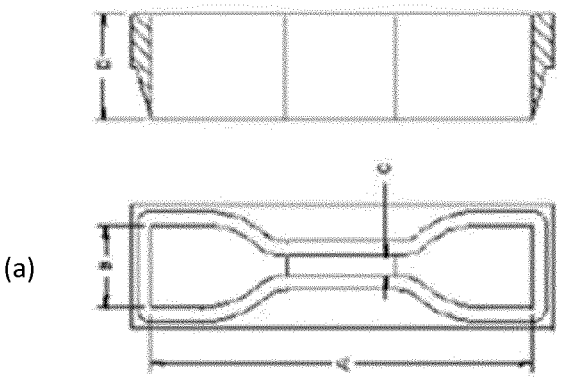
Figure 2:
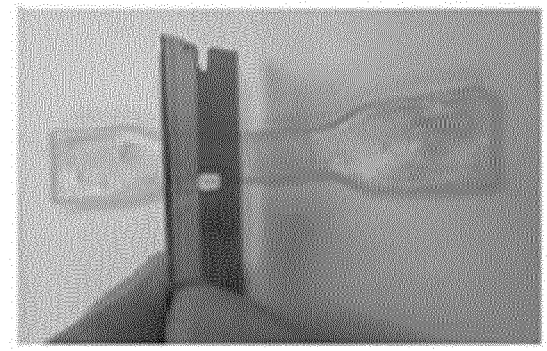

Films of sample 11 prepared following the procedure of example 1 were cut in the form of dumbbell-shaped specimens with dimensions according to ISO 37 type 2 standard in order to perform the tensile strength measurements. Some of the specimens were mechanically tested as pristine samples. The rest of them were tested after having been cut in half with a cutter (see FIG. 2), then mended for 15 seconds by simple contact and left on a flat surface for different periods of time (24 and 96 hours).

Tensile strength measurements were performed using an Instron under humidity of 50% and at a temperature of 20° C., and stress vs. strain curves were monitored. The interface type of the Instron was a Series 42/43/4400.

Figure 3:
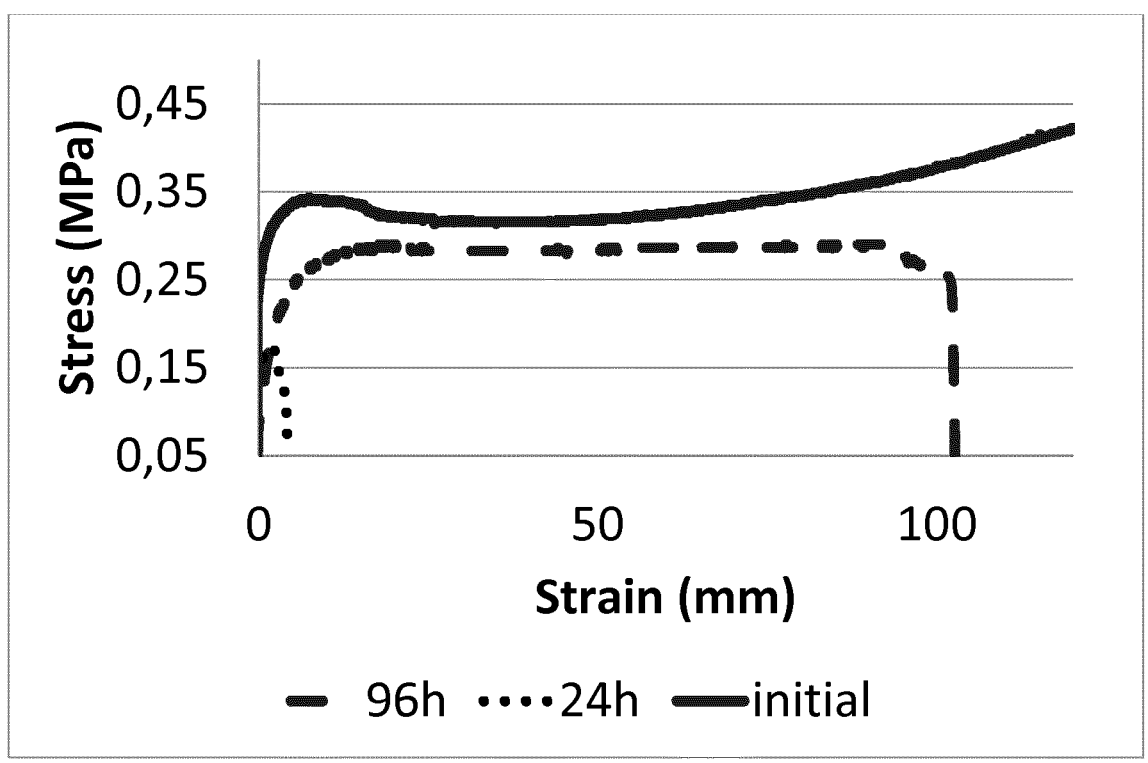
FIG. 3 shows the results of the stress-strain test applied to sample 11: —— initially and after having been cut in half and the two halves being then allowed to stand by simple contact for ···· 24 hours and ---- 96 hours.

Briefly, the dumbbell-shaped specimens were stretched at an elongation rate of 50 mm/min and the values of stress (MPa) and strain (mm) were measured until the specimen is broken. The results are shown in FIG. 3.

As it can be observed, the mended samples showed after 96 hours a tensile strength quite similar to the pristine samples, allowing a considerable elongation of the sample until it brokes. This can be considered a quite remarkably result for the formulation of the invention.

Example 4. Measurement of the Healing Process

A film of the sample 11 prepared following the procedure of example 1 was cut in the form of a dumbbell-shaped specimen with dimensions according to ISO 37 type 2 standard. A cut was made with a cutter on one of the ends of the specimen. The two separated portions were then put in contact and then allowed to stand at room temperature for 3 hours, 8 hours and 24 hours, without applying any pressure. The healing process was monitored visually.

Figure 4:
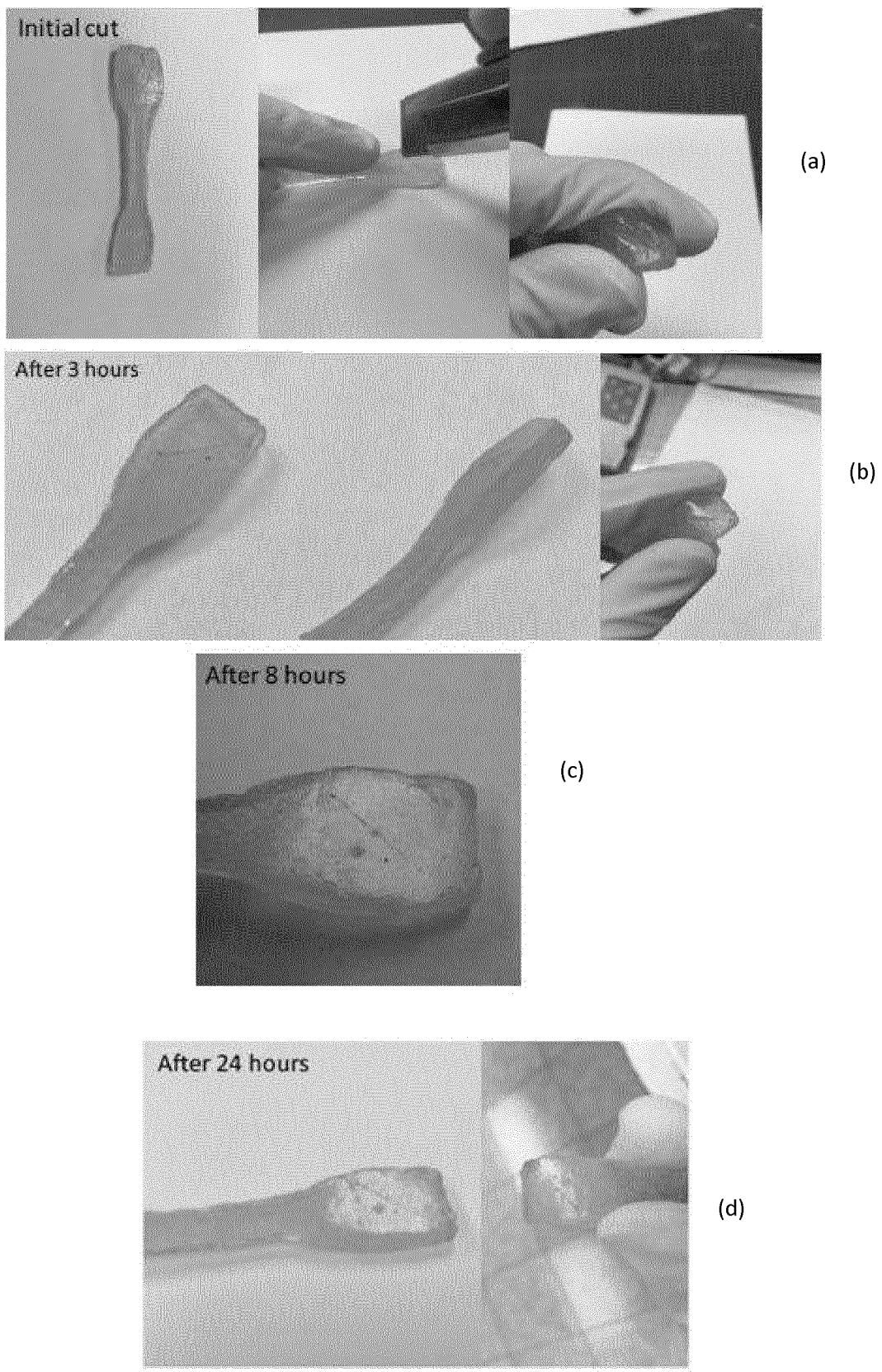
FIG. 4 shows a photograph sequence of a dumbbell-shaped specimen of sample 11 (a) on which a cut was made with a cutter at one of its ends. The two separated portions were then allowed to stand by simple contact for (b) 3 hours; (c) 8 hours and (d) 24 hours.

As can be observed from FIG. 4, the cut was already healed after 3 hours. Moreover, after 24 hours, the material could be manually stretched without rupture.

The invention claimed is:

1. A formulation suitable for the manufacture of pressure sensitive adhesive, said formulation comprising:
    a) 40-95 wt % of polylalkylene carbonate having a weight average molecular weight equal to or higher than 17,000 Da;
    b) 5-60 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol; and
    c) optionally, less than 30 wt % of a tackifying resin, wherein the weight percentages of the components a), b) and c) of the formulation are based on the total weight of the formulation,
    provided that said formulation does not contain any reticulating agent,
    and wherein the average weight molecular weight of the polylakylene carbonate is determined by gel-permeation chromatography.

2. The formulation according to claim 1 comprising:
    a) 55-95 wt % of polyalkylene carbonate having a weight average molecular weight equal to or higher than 17,000 Da;
    b) 5-45 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol; and
    c) optionally, less than 30 wt % of a tackifying resin;
    wherein the weight percentages of the components a), b) and c) of the formulation are based on the total weight of the formulation,
    provided that said formulation does not contain any reticulating agent.

3. The formulation according to claim 1 comprising:
    a) 75-95 wt % of polylakylene carbonate having a weight average molecular weight equal to or higher than 17,000 Da;
    b) 5-25 wt % of a polyether carbonate polyol having $CO_2$ groups randomly incorporated in the chemical structure thereof, wherein the content of $CO_2$ ranges from 0.5 to 40 wt %, based on the total weight of the polyether carbonate polyol; and
    c) optionally, less than 10 wt % of a tackifying resin;
    wherein the weight percentages of the components a), b) and c) of the formulation are based on the total weight of the formulation,
    provided that said formulation does not contain any reticulating agent.

4. The formulation according to claim 1, wherein the polyether carbonate polyol has from 5 to 25 wt % of carbon dioxide, based on the total weight of the polyether carbonate polyol.

5. The formulation according to claim 1, wherein the polyether carbonate polyol is obtainable by a process comprising copolymerizing one or more H-functional initiator substances, one or more alkylene oxides and carbon dioxide in the presence of a double metal cyanide catalyst, wherein said double metal cyanide catalyst is obtained by a process comprising:
    a) synthesizing a solid double metal cyanide catalyst in the presence of an organic complexing agent and a polyether polyol ligand; and
    b) first washing the catalyst obtained in step a) with an aqueous solution comprising:
    90-100 wt % of water; and
    0-10 wt % of a polyether polyol ligand,
    to form a slurry, wherein the aqueous solution does not contain any organic complexing agent other than the polyether polyol ligand.

6. The formulation according to claim 1, wherein the polyether carbonate polyol is a polyether carbonate triol or a polyether carbonate diol.

7. The formulation according to claim 1, wherein the equivalent molecular weight of the polyether carbonate polyol is higher than 500 Da.

8. The formulation according to claim 1, wherein the polyalkylene carbonate is the resulting product of copolymerizing $CO_2$ with alkylene oxide in the presence of a catalyst.

9. The formulation according to claim 1, wherein the polyalkylene carbonate has on average more than about 75% of adjacent monomer units connected via carbonate linkages.

10. The formulation according to claim 1, wherein the polyalkylene carbonate has a weight average molecular weight ranging from 20,000 to 500,000 Da, wherein said average weight molecular weight is determined by gel-permeation chromatography.

11. The formulation according to claim 1, wherein the polyalkylene carbonate is selected from polypropylene carbonate, polyethylene carbonate and mixtures thereof.

* * * * *